United States Patent [19]

Shimizu

[11] Patent Number: 5,765,060
[45] Date of Patent: Jun. 9, 1998

[54] PHOTOMETRY DEVICE FOR A CAMERA

[75] Inventor: Hitoshi Shimizu, Tokyo, Japan

[73] Assignee: Asahi Kogaku Kogyo Kabushiki Kaisha, Tokyo, Japan

[21] Appl. No.: 564,874

[22] Filed: Nov. 28, 1995

[30] Foreign Application Priority Data

Nov. 29, 1994 [JP] Japan ................................. 6-319078

[51] Int. Cl.⁶ ........................................... G03B 7/099
[52] U.S. Cl. ........................... 396/268; 396/429; 396/508
[58] Field of Search ........................... 396/270, 272, 396/268, 505, 510, 257–260, 508, 429; 348/362–366, 64

[56] References Cited

U.S. PATENT DOCUMENTS

| | | |
|---|---|---|
| 3,240,136 | 3/1966 | Fujimori . |
| 3,690,241 | 9/1972 | Nomura . |
| 4,348,088 | 9/1982 | Yamamichi et al. ............... 396/268 |
| 4,953,029 | 8/1990 | Morimoto et al. .................. 348/64 |

Primary Examiner—W.B. Perkey
Attorney, Agent, or Firm—Greenblum & Bernstein P.L.C.

[57] ABSTRACT

A light redirecting member moves in concert with an aperture mechanism between a first position to redirect light to a metering sensor and a second position to allow light to pass to an imaging sensor. A motor drives the aperture mechanism to predetermined positions, swinging the associated light redirecting member in and out of an optical path from an imaging optical system to the imaging sensor.

36 Claims, 6 Drawing Sheets

PHOTOMETRY DEVICE FOR A CAMERA

BACKGROUND OF THE INVENTION

The present invention relates to a photometry device to be employed in a camera having an imaging sensor such as a charge coupled device (CCD). Conventionally, a beam splitter or prism is fixed between an imaging optical system and an imaging sensor. This redirects a full-field portion of light entering the camera body via the imaging optical system, and leads it to a metering sensor (light measuring element). If a prism or beam splitter is fixed on the CCD, light must always pass through the prism or beam splitter to form an image thereon, and image quality suffers. Furthermore, the imaging optical system and image sensing device must have a large spacing therebetween to mount the optical elements (i.e., beam splitter or prism). Thus, the imaging system is bulky, and flexibility in optical designing is limited.

Also known is a quick-return mirror fixed between the imaging optical system and the imaging sensor, which is swingable about an axis perpendicular to the optical path. The mirror is held against the bias of a charging return spring, blocking the optical path between the imaging optical system and imaging sensor, and is released when an image exposure is taken. When the camera is performing a photometry operation, light is reflected to the metering sensor via the mirror. When the camera is image sensing, the quick return mirror is released and retracted from the optical path by the charged return spring, opening the aforementioned optical path. In this case, it is necessary to have a dedicated drive mechanism for switching the position of the quick return mirror and charging a spring or springs. The construction of such a device is complicated and expensive.

SUMMARY OF THE INVENTION

It is therefore an object of the present invention to provide an improved light measuring device wherein the space between the imaging optical system and imaging sensor is minimized, and wherein the light is directed to a metering sensor without a dedicated driving mechanism.

In order to achieve the objects of the invention, an improved photometry device includes an imaging sensor. An imaging optical system directs incident light upon the imaging sensor, and forms an optical path from the imaging optical system to the imaging sensor. An aperture mechanism having a variable aperture controls an amount of light passing through the imaging optical system. An aperture drive drives the aperture mechanism. A metering sensor measures an amount of light and is positioned remote from the optical path. A light redirecting member, for redirecting light from the optical path to the metering sensor is also provided. The light redirecting member is movably supported to move into and out of the optical path. A converting mechanism converts motion of the aperture drive into motion of the light redirecting member into and out of the optical path.

Accordingly, the light redirecting member is moved in and out of the optical path in cooperation with the aperture drive, and does not require a separate driving mechanism.

In a particular embodiment, the aperture drive includes a driving disk rotatable by a motor to control a size of the variable aperture. The converting mechanism converts rotational motion of the driving disk to motion of the light redirecting member into and out of the optical path.

This provides a simple, compact drive for driving both the aperture mechanism and the light redirecting member.

The light redirecting member is preferably swingably supported to swing about an swinging axis parallel to, and displaced from, the optical path, and the converting mechanism converts the motion of the aperture drive to swinging motion of the light redirecting member about the swinging axis into and out of the optical path. This enables the light redirecting member to easily swing in and out of the optical path, and reduces the space between the imaging optical system and the imaging sensor.

In another particular embodiment, the light redirecting member includes a reflective surface provided on the light redirecting member at a distance from the swinging axis. The distance corresponds to the distance between (i.e., separating) the swinging axis and the optical path.

According to another aspect of the present invention, a photometry device includes an imaging optical system which directs incident light. A moving mechanism moves a predetermined optical element in the imaging optical system. A metering sensor measures an amount of light. A redirecting mechanism redirects the incident light to the metering sensor, and is movable between operative and retracted positions. A converting mechanism converts a driving force of the moving mechanism to a driving force for moving the redirecting mechanism between the operative and retracted positions.

In this manner, the redirecting mechanism moves between operative and retracted positions in association with the moving mechanism of a particular optical element of the photometry device. That is, the moving mechanism moves two different elements.

Preferably, the moving mechanism includes a driving disk rotatable by a motor, and the converting mechanism converts a driving force of the driving disk to a driving force for moving the redirecting mechanism between the operative and retracted positions. Thus, the moving mechanism is simple and compact.

In one particular embodiment, the redirecting mechanism includes a reflective surface provided to the light redirecting member at a distance from the swinging axis corresponding to the displacement of the swinging axis from the optical path.

According to a preferred embodiment, the redirecting mechanism is swingably supported to swing about a swinging axis parallel to and displaced from, an optical path of the imaging optical system. The converting mechanism converts the driving force of the driving disk to drive the redirecting mechanism about the swinging axis into and out of the optical path. Particularly, the operative position is a position in the optical path, and the retracted position is a position out of the optical path. In this manner, rotational and swinging motions cooperate in the driving of the driving disk and the redirecting mechanism.

According to another aspect of the present invention, an imaging device includes first and second optically responsive elements. An imaging optical system directs incident light upon the first optically responsive element. An aperture mechanism having a variable aperture controls the amount of light passing through the imaging optical system. An aperture drive drives the aperture mechanism. A light redirecting member redirects the incident light from the imaging optical system to the second optically responsive element. A moving mechanism moves the light redirecting member into and out of an optical path between the imaging optical system and the first optically responsive element. The moving mechanism being driven by movement of the aperture drive.

Accordingly, the light redirecting member is moved to switch the light between the first and second optically responsive elements in association with a motion of the aperture drive, making the system compact and inexpensive.

Preferably, the aperture drive includes a driving disk rotatable by a motor to control a size of the variable aperture. Rotational motion of the driving disk drives the moving mechanism to move the redirecting member into and out of the optical path between the imaging optical system and the first optically responsive element.

Further preferably, the light redirecting member is swingably supported to swing about a swinging axis parallel to, and displaced from, the optical path. The moving mechanism moves the light redirecting member about the swinging axis into and out of the optical path. In this manner, rotational and swinging motions cooperate in the driving of the driving disk and the redirecting mechanism to redirect the light from one optically responsive element to another.

It is further preferred that a reflective surface is provided to the light redirecting member at a distance from the swinging axis corresponding to the displacement of the swinging axis from the optical path.

According to yet another aspect of the invention, an imaging device includes an imaging sensor. An optical system forms an image on the imaging sensor from light passing through the optical system along an optical path. The optical system includes an aperture mechanism having an aperture drive for controlling the amount of light passing through the optical system. A swingable member is swingable about a swinging axis parallel to, and displaced from, the optical path. A distal end of the swingable member is swingable into and out of the optical path. A surface provided on the distal end of the swingable member blocks a portion of the light when the distal end of the swingable member is swung into the optical path. A measuring mechanism measures an amount of light incident on the surface. A transmitting mechanism transmits motion from the aperture mechanism to swing the distal end of the swingable member into and out of the light.

Accordingly, the surface from which the amount of incident light is measured can swing into the optical path at the distal end of a swingable member (about an axis parallel to the optical path) using driving motion transmitted from the aperture drive. The combination of driving and swinging motions makes the device simple and compact.

Preferably, the aperture drive includes a driving disk rotatable by a motor to control an amount of light passing through the optical system. Further preferably, the surface includes a reflective surface for reflecting light to the measuring mechanism, and the reflective surface is on the distal end of the swingable member at a distance from the swinging axis corresponding to the displacement of the swinging axis from the optical path.

DETAILED DESCRIPTION OF THE PREFERRED EMBODIMENTS

Figure 1:
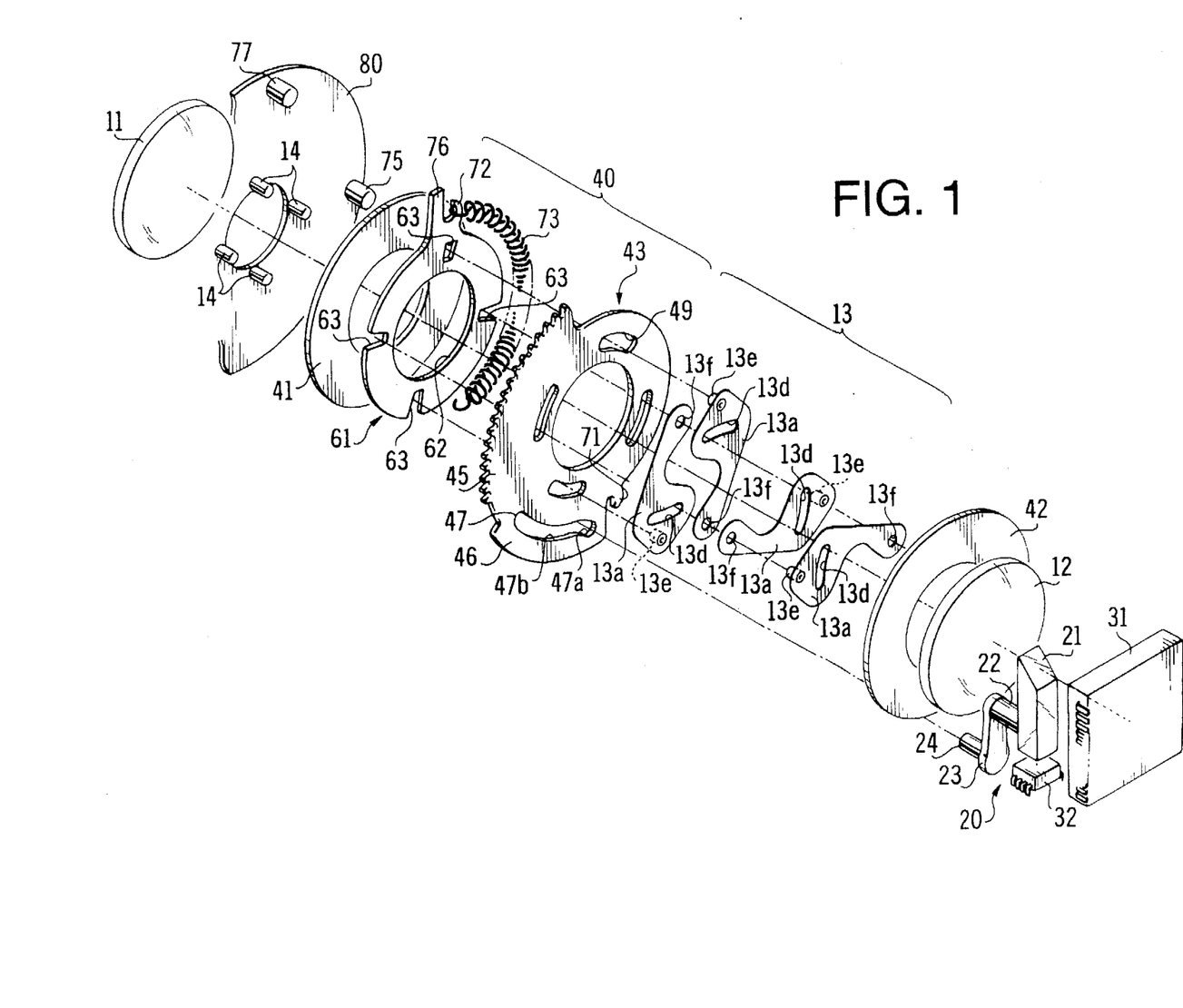
FIG. 1 is an exploded view of an embodiment of a photometry device according to the invention.
Figure 2:
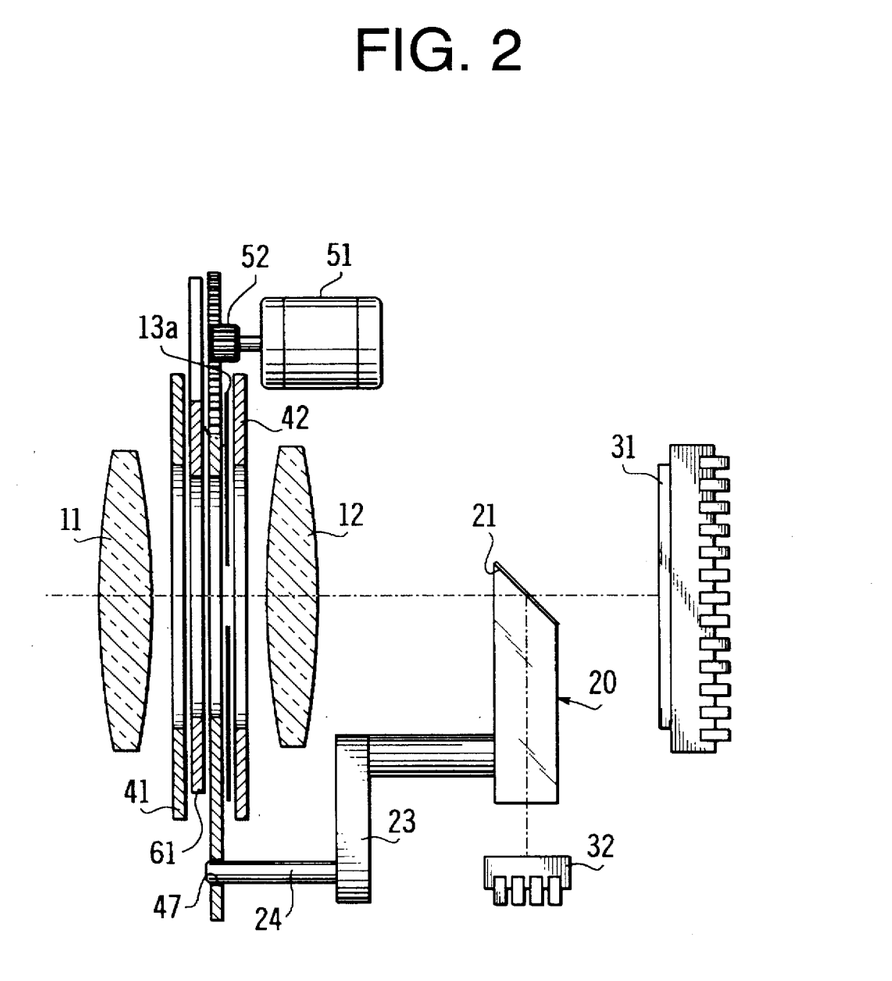
FIG. 2 is a side schematic view of the embodiment of a photometry device.

As shown in FIGS. 1 and 2, the photometry device according to the embodiment is provided inside a camera (not shown), and includes an imaging optical system, an imaging sensor 31 (for example, a CCD), a metering sensor 32 (for example, a photocell), and a light redirecting member 20. The imaging sensor 31 and metering sensor 32 are each optically responsive elements, the imaging sensor 31 being able to sense image content while the metering sensor 32 measures an amount of light. The imaging optical system includes a front lens group 11, a rear lens group 12, and an aperture mechanism 13. The aperture mechanism 13 controls the area of light flux passing through the imaging optical system, and is provided between the lens groups 11 and 12. The light redirecting member 20 for light measurement is provided at the rear side of the rear lens group 12. An image sensor 31 is provided at the rear side of the light redirecting member 20. A metering sensor 32 is arranged at the lower side of the light redirecting member 20.

Figure 5:
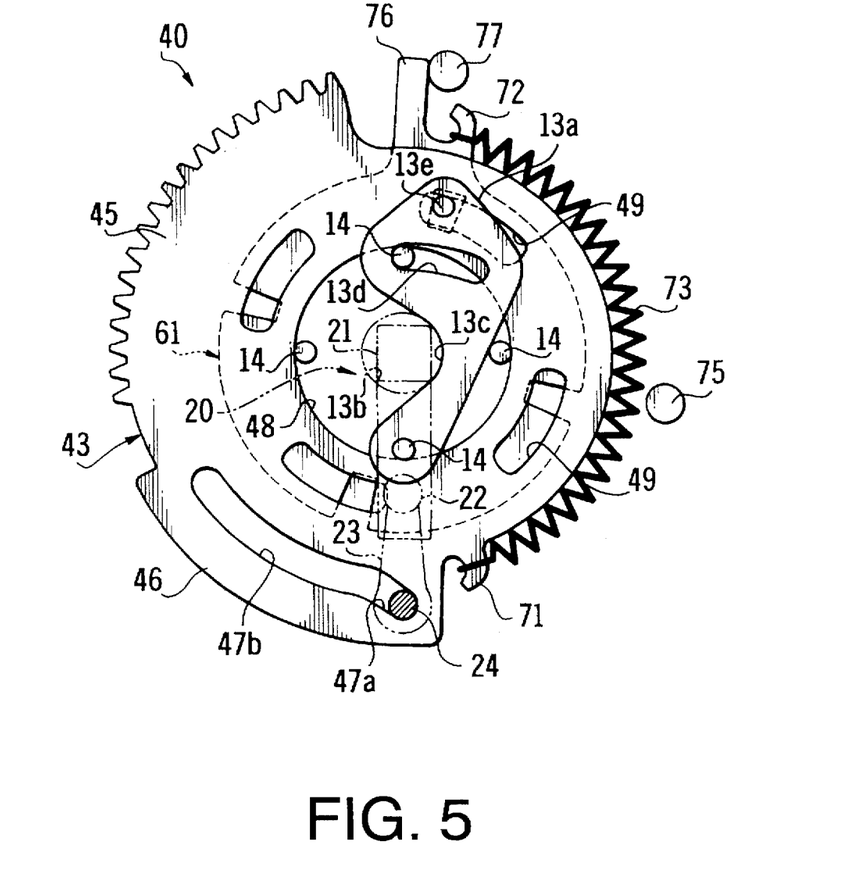
FIG. 5 is a plan view of the embodiment of a photometry device, showing a first position.

The aperture mechanism 13 includes four circumferentially distributed aperture blades 13a defining a variable aperture (opening) 13b (shown in FIG. 5). The aperture mechanism 13 is driven by an aperture drive 40, which includes main and auxiliary driving disks 43 and 61. The aperture drive 40 is driven by a motor 51 (shown in FIG. 2). The aperture drive 40 drives the respective aperture blades 13a to rotate about respective pivot pins 14 on a stationary frame 80, controlling the area of light flux passing through the variable aperture 13b (shown in FIG. 5) formed by the aperture blades 13a. The area of light flux, or amount of light, is represented by an aperture value.

The auxiliary driving disk 61, main driving disk 43, and aperture blades 13a are sandwiched, in that order, between first and second supporting rings 41 and 42. The main driving disk 43 and auxiliary driving disk 61 are coaxially and rotatably supported by the four pivot pins 14. The optical axis of the imaging optical system is coaxial with the centers of rotation of the main and auxiliary driving disks 43 and 61.

Figure 3:
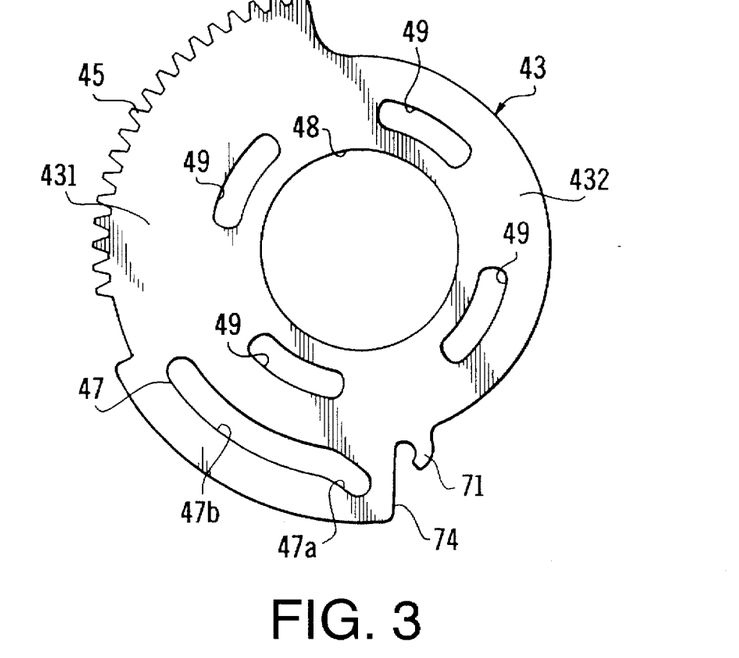
FIG. 3 is a plan view of a main driving disk of the embodiment.
Figure 4:
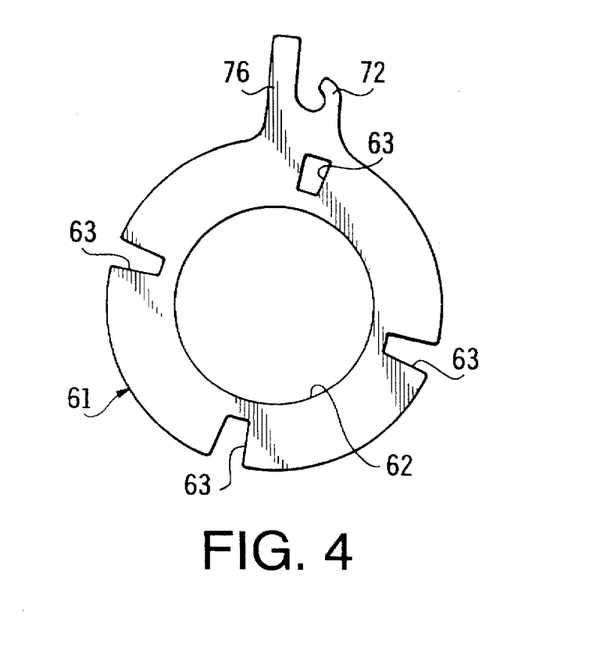
FIG. 4 is a plan view of an auxiliary driving disk of the embodiment.

FIG. 3 illustrates the main driving disk 43, and FIG. 4 illustrates the auxiliary driving disk 61. As shown in FIG. 3, the main driving disk 43 is roughly annular, having a round hole 48 formed in the center for supporting the disk 43 and for allowing light to pass through to the imaging optical system. The main driving disk 43 is rotatable via the hole 48 about the combination of four pivot pins 14 on the stationary frame 80 (shown in FIG. 1), and includes a larger radius sector 431 and a smaller radius sector 432. The smaller radius sector 432 is substantially the same radius as the supporting annular disks 41 and 42. A portion of the larger radius sector 431 is formed as a sector gear 45, which protrudes from between the annular supporting disks 41 and 42. A gear 52 (shown in FIG. 2) mounted on an output shaft of the motor 51 meshes with the sector gear 45. A cam groove 47 is formed in the remaining portion of the larger radius sector 431 of the main driving disk 43. The cam groove 47 includes an arcuate portion 47b, and an inclined portion 47a. The arcuate portion 47b is formed with the arc center being coaxial with the center of rotation of the main driving disk 43 (coaxial with the optical axis of the imaging optical system), and the inclined portion 47a extending away from the center of rotation of the main driving disk 47a. The distance of the camming surfaces of the inclined portion 47a from the center of rotation of the main driving disk 43 varies depending on the angular position of the disk 43. Four arcuate slots 49, having centers coaxial with the center of rotation of the disk 43, are equally distributed about the round hole 48 for driving the aperture blades 13a.

A hook 71 is formed on the main driving disk 43 where the cam groove end of the larger radius sector 431 meets the smaller radius sector 432. The side of the larger radius sector 431 at the cam groove end acts as a contact surface 74.

As shown in FIG. 4, the auxiliary driving disk 61 has a round hole 62 formed therein for supporting the disk 61 and for allowing light to pass through to the imaging optical system. Similar to the main driving disk 43, the auxiliary driving disk 61 is rotatable via the hole 62 about the combination of four pivot pins 14 on the stationary frame 80. Further, four pin engaging slots 63 are formed therein, evenly distributed about the disk 61, for engaging respective drive pins 13e (shown in FIG. 1) of respective aperture blades 13a. A contact extension 76 extends from the outer circumference of the auxiliary driving disk 61, and a hook 72 is formed on the circumference of the disk 61 in the vicinity of the contact extension 76.

As shown in FIGS. 1 and 5, the hook 71 of the main driving disk 43, and the hook 72 of the auxiliary driving disk 61 are connected and biased to rotate toward each other by a circumferentially extending spring 73, which is held in a circumferential curve by the surfaces of the aperture drive 40 and surrounding surfaces. The contact surface 74 of the main driving disk 43 selectively contacts a first stopper 75 formed on the stationary frame 80. The first stopper 75 limits the range of rotation of the main driving disk 43. Similarly, the contact extension 76 of the auxiliary driving disk 61 selectively contacts a second stopper 77 formed on the stationary frame 80. The second stopper 77 limits the range of rotation of the auxiliary driving disk 61.

Figure 6:
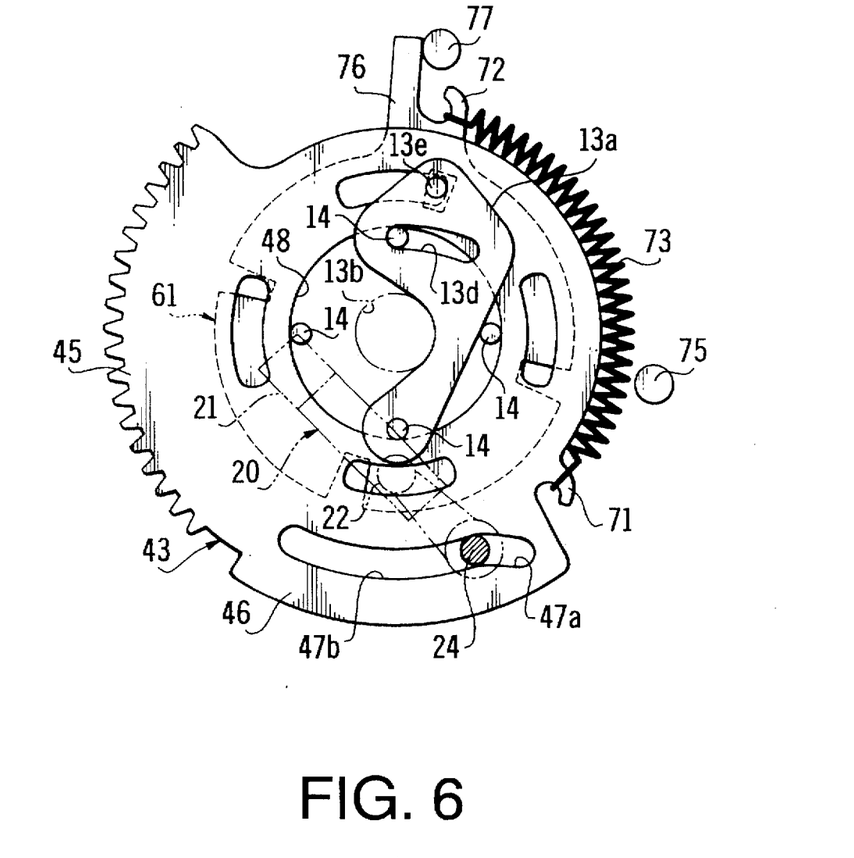
FIG. 6 is a plan view of the embodiment of a photometry device, showing a second position.
Figure 7:
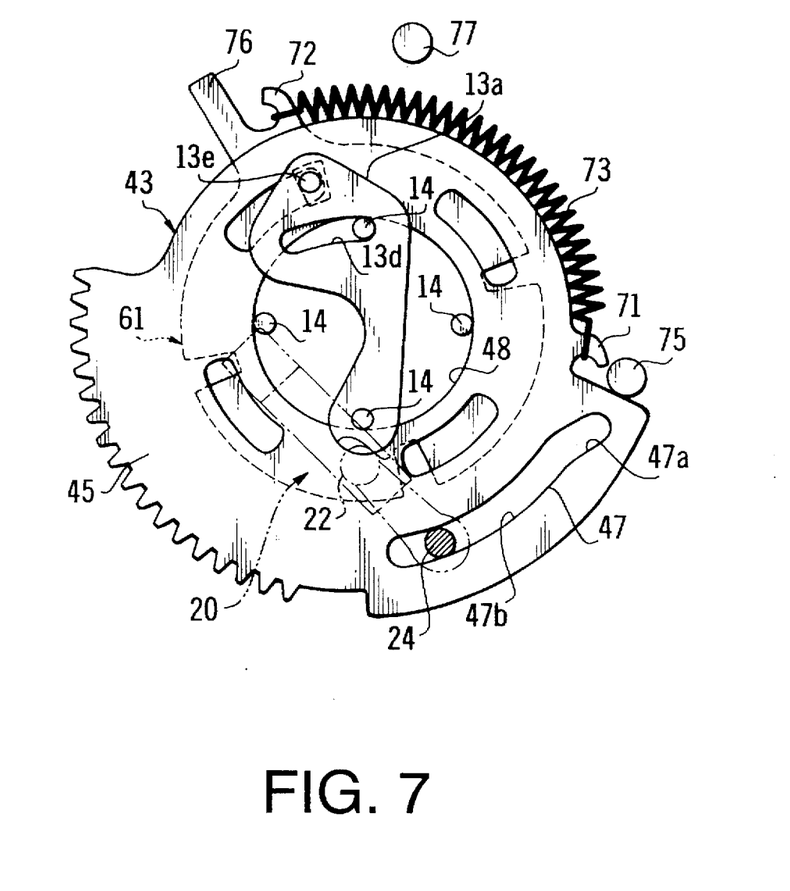
FIG. 7 is a plan view of the embodiment of a photometry device, showing a third position.

Although only one aperture blade 13a is shown in FIGS. 5 through 7, four evenly distributed aperture blades 13a are provided in the aperture mechanism 13. Each of the four aperture blades 13a is swingable via a pivot hole 13f about one of the four pivot pins 14 (shown in FIG. 1). Each aperture blade 13a has an curved iris portion 13c (shown in FIG. 5) for forming the variable aperture 13b. Further, each aperture blade 13a includes an arcuate groove 13d formed therein, each arcuate groove 13d having an arc center at the pivot pin 14 about which the respective blade 13a swings. In each respective aperture blade 13a, the arcuate groove 13d allows a diametrically opposite (across the aperture 13b) pivot pin 14 to pass through the respective aperture blade 13a, and allows the respective aperture blade 13a to swing without interfering with the diametrically opposite pivot pin 14. A drive pin 13e is provided at the swinging end of each of the respective aperture blades 13a. When the aperture mechanism 13 is assembled, the drive pins 13e pass through respective arcuate slots 49 on the main drive disk 43, and through respective engaging slots 63 on the auxiliary drive disk 61. The drive pins 13e are driven to close the aperture 13b by the arcuate slots 49 of the main drive disk 43, and are driven in an opposite direction to open the aperture by the engaging slots 63 of the auxiliary drive disk 61.

As shown in FIGS. 1 and 5, the light redirecting member 20 is an elongated member, and the base of the light redirecting member 20 is fixed to a supporting shaft 22. An inclined reflective surface 21 is provided at a distal end of the light redirecting member 20, remote from the supporting shaft 22, to redirect the incident light. In this embodiment, the reflective surface 21 reflects all the light incident thereon. The light redirecting member 20 is preferably a transparent prism having a reflective surface 21, and light redirected by the member 20 passes through the transparent prism. Alternatively, the light redirecting member 20 is a hollow frame, and the reflective surface 21 is a mirror surface mounted in the frame. The supporting shaft 22 is parallel to the optical axis of the optical system, and rotatably supported in the camera. A crank 23 is formed at the end of the supporting shaft 22. The crank 23 extends away from the optical axis O, and has a cam follower pin 24 formed on the end of the crank 23 remote from the shaft 22. The supporting shaft 22 constitutes an axis about which the crank 23 and light redirecting member 20 rotate. The axis of the cam follower pin 24 is parallel to the supporting shaft 22. Thus, the cam follower pin 24 extends along an axis displaced from the supporting shaft 22, and the cam follower pin 24 is swingable about the supporting shaft 22. The pin 24 engages the cam groove 47 formed in the main driving disk 43.

In this embodiment, the light redirecting member 20 extends (from its connection to the shaft 24) in the same direction as the crank 23. Depending on the rotational position of the main driving disk 43, when the pin 24 is in the arcuate portion 47a of the cam groove 47, the reflective surface 21 of the light redirecting member 20 is kept in a position swung away from the optical path extending from the imaging optical system to the imaging sensor 31. When the pin 24 enters the inclined portion 47b, the reflective surface 21 swings into the optical path extending from the imaging optical system to the imaging sensor 31. Thus, the pin 24 and cam groove 47 (with the associated links) form means for converting or transmitting the driving force or motion of the aperture drive 40 to the light redirecting member 20. That is, the light redirecting member 20 is supported in such a manner that it can be moved toward and away from the optical path of the optical system, within a plane perpendicular to the optical path, in coordination with the movement of the aperture drive 40.

The full size of the reflective surface 21 is sufficient to redirect the luminous flux to the metering sensor 32 during light measurement. That is, the reflective surface 21 redirects just enough light to cover the sensing area of the metering sensor 32. The metering sensor 32 is preferably a smaller sensing area than the image sensor 31.

FIGS. 5 through 7 show different positions of the iris aperture mechanism 13, aperture drive 40, and light redirecting member 20 of the photometry device according to the embodiment. The aperture mechanism 13 and aperture drive 40 constitute a predetermined optical element having movement with which the swinging of the light redirecting member is associated. The opening amount and aperture value of the variable aperture 13b are controlled by rotating the main driving disk 43 and auxiliary driving disk 61. As previously described, although four aperture blades 13a are provided in his embodiment, only one of the blades 13a is illustrated in FIGS. 5 through 7.

FIG. 5 is a view of the aperture blades 13a and the aperture drive 40 when the photometry device is set to measure light using the metering sensor 32, shown from the rear side of the imaging optical system. That is, FIG. 5 shows an operative position of the light redirecting member 20. At this time, the main driving disk 43 is positioned at the predetermined position shown in FIG. 5, driven by the gear 52 of the motor 51 (shown in FIG. 2). In this position, the auxiliary driving disk 61 is biased to rotate in the clockwise direction by spring 73, and the contact extension 76 contacts the second stopper 77 on the stationary frame 80. The respective drive pins 13e of each of the aperture blades 13a (although only one blade 13a is shown) are held by the engaging slots 63 (shown in FIGS. 1 and 4) of the auxiliary drive disk 61. Accordingly, the swinging positions of the aperture blades 13a are regulated to predetermined angles. In FIG. 5, the variable aperture 13b of the aperture mechanism 13 is shown in a fully open condition. During light measurement, the cam groove 47 is positioned such that the most remote portion of the inclined portion 47a (from the rotary center of the main driving disk 43) is aligned with the shaft 22 and the center of rotation of the driving disk 43 (coaxial with the optical axis of the imaging optical system). The cam follower pin 24, following the cam groove 47, is thereby also aligned with the shaft 22 and optical axis. Consequently, the light redirecting member 20 is aligned with the optical axis such that the distal end thereof, and the reflective surface 21, is interposed in the optical path extending from the imaging optical system to the imaging sensor 31. This position is illustrated in FIG. 1 and in FIG. 5. At this time, the luminous flux, having passed through the imaging optical system, is reflected at the reflective surface 21 (positioned at the distal end of the light redirecting member 20) to the metering sensor 32, the reflective surface 21 being positioned to block the variable aperture 13b of the aperture mechanism 13.

In order for the imaging sensor 31 to generate an image from the luminous flux, the main driving disk 43 is rotated by the motor 51 in the counterclockwise direction by a predetermined amount of about 40° (for example) to the position shown in FIG. 6, which shows a retracted position of the light redirecting member 20. When the main driving disk 43 is rotated by an amount equal to or less than the predetermined amount, the auxiliary driving disk 61 remains biased in the clockwise direction by the spring 73, the contact portion 76 remains in contact to the stopper 77, and the engaging slots 63 of the auxiliary driving disk 61 keep the variable aperture 13b open. The arcuate slots 49 formed on the main driving disk 43 allow the main driving disk 43 to be rotated counterclockwise by at least the predetermined amount without driving the drive pins 13e. Simultaneously, the cam groove 47 is rotated to contact the arcuate portion 47a to the cam follower pin 24. As the distance of the arcuate portion 47b from the rotary center of the main driving disk 43 is less than that of the inclined portion 47a, the cam follower pin 24 swings the crank 23 toward the center of rotation of the main driving disk (coaxial with the optical axis of the imaging optical system). Consequently, the distal end (bearing reflective surface 21) of the light redirecting member 20 swings counterclockwise away from the optical axis O by about 40°, as shown in FIG. 6. That is, the light redirecting member 20 is retracted from the optical axis in cooperation with the main driving disk 43 of the aperture driving mechanism 40. When the imaging sensor 31 senses the image content of the light passing through the imaging optical system, the light redirecting member 20 is completely retracted out of the optical path from the imaging optical system 40 to the imaging sensor 31. The luminous flux is not blocked, and forms an image on the light receiving surface of the imaging sensor 31.

Upon further rotation of the main driving disk 43 in the counterclockwise direction from the condition illustrated in FIG. 6 toward the condition illustrated in FIG. 7, the side wall of the arcuate slots 49 of the main driving disk 43 drive the drive pins 13e of the aperture blades 13a in the counterclockwise direction. Consequently, the aperture blades 13a are rotated in the counterclockwise direction, so the variable aperture 13b (opening) becomes small. Simultaneously, the auxiliary driving disk 61 follows the drive pins 13e by virtue of the engagement of the engaging slots 63, and the contact extension 76 of the auxiliary driving disk 43 is driven counterclockwise away from the second stopper 77. As the main driving disk 43 and the aperture blades 13a are rotated until the pivot pins 14 reach the ends of the arcuate grooves 13d, the variable aperture 13b completely closes. At this time, as shown in FIG. 7, the contact surface 74 of the main driving disk 43 contacts the first stopper 75. This is also a retracted position of the light redirecting member 20. It should be noted that as the main driving disk 43 is rotated from the position shown in FIG. 6 to the position shown in FIG. 7, the cam follower pin 24 follows the arcuate portion 47b of the cam groove 47 at a constant distance from the center of rotation of the main driving disk 43, and the light redirecting member 24 rotates no further.

Since the reflective surface of the light redirecting member need only direct sufficient light to the metering sensor, the reflective surface area can be much smaller than the full-field or imaging sensor area, further reducing the size of the light redirecting member, and improving the utilization of space.

Since the light redirecting member reflects the incoming light flux in a direction perpendicular to the optical path, and is retractable perpendicular to the optical path, the size of the light redirecting member is reduced to that necessary to redirect sufficient light for measurement by the metering sensor. As mentioned above, the metering sensor requires only a portion of the light to take a photometry measurement, and the light redirecting member is therefore small.

As the light redirecting member is considerably smaller than an optical element such as a full-field beam splitter or prism, the spacing between the imaging optical system and the image sensing device 31 is significantly decreased, so that the equivalent space may be used for alternative optical configurations, and freedom in optical design is increased.

Furthermore, in the described embodiment, as the position of the light redirecting member 20 is changed by means of the aperture driving mechanism 40, it is unnecessary to provide a driving mechanism just for the light redirecting member 20, resulting in simple construction and low cost.

The present disclosure relates to subject matter contained in Japanese Patent Application No. HEI 06-319078, filed on Nov. 29, 1994, which is expressly incorporated herein by reference in its entirety.

What is claimed is:

1. A photometry device, comprising:

an imaging sensor;

an imaging optical system for directing incident light upon said imaging sensor, and for forming an optical path from said imaging optical system to said imaging sensor;

an aperture mechanism having a variable aperture for controlling an amount of light passing through said imaging optical system;

an aperture drive for driving said aperture mechanism;

a metering sensor for measuring an amount of light, provided in a position remote from said optical path;

a light redirecting member, for redirecting light from said optical path to said metering sensor, said light redirecting member being mounted movably to move into and out of said optical path;

means for converting motion of said aperture drive into motion of said light redirecting member into and out of said optical path;

a motor;

said aperture drive including a driving disk rotatable by said motor to control a size of said variable aperture; and said means for converting converts rotational motion of said driving disk into motion of said light redirecting member into and out of said optical path.

2. The photometry device according to claim 1, wherein said means for converting further comprises:

a cam groove formed in said driving disk, a distance separating said cam groove from a rotational center of said driving disk varying with respect to an angular position of said driving disk; and a cam follower pin linked to said light redirecting member, sand cam follower pin following said cam groove and moving said light directing member.

3. The photometry device according to claim 2, wherein a variation of said distance is a predetermined range for limiting a range of movement of said light redirecting member.

4. The photometry device according to claim 2, wherein said means for converting further comprises:

a rotatable shaft to which said light redirecting member is secured, said rotatable shaft defining a swinging axis; and a crank attached to said rotatable shaft and swingable with said rotatable shaft about said swinging axis, said cam follower pin extending from said crank at a position displaced from said rotatable shaft, whereby movement of said cam groove by said cam follower pin produces swinging motion of said light redirecting member into and out of said optical path.

5. The photometry device according to claim 4, said swinging axis being parallel to, and displaced from, said optical path.

6. The photometry device according to claim 1, further comprising:

said light redirecting member being swingably supported to swing about a swinging axis, said axis being parallel to, and displaced from, said optical path, and said means for converting converts rotational motion of said driving disk to swinging motion of said light redirecting member about said swinging axis into and out of said optical path.

7. The photometry device according to claim 6, wherein said light redirecting member further comprises:

a reflective surface provided on said light redirecting member at a distance from said swinging axis, said distance corresponding to a displacement of said swinging axis from said optical path.

8. The photometry device according to claim 1, further comprising:

said light redirecting member being swingably supported to swing about a swinging axis parallel to, and displaced from, said optical path, and said means for converting converts said motion of said aperture drive to swinging motion of said light redirecting member about said swinging axis into and out of said optical path.

9. The photometry device according to claim 1, further comprising:

said light redirecting member being movably supported to move in a plane perpendicular to said optical path, and said means for converting converts said motion of said aperture drive to motion of said light redirecting member within said plane and into and out of said optical path.

10. The photometry device according to claim 1, wherein said aperture drive is drivable in a closing direction to close said variable aperture and an opening direction to open said variable aperture, and wherein said means for converting converts said motion of said aperture drive into motion of said light redirecting member out of said optical path when said aperture drive drives said aperture mechanism in said closing direction.

11. The imaging device of claim 1, wherein said light redirecting member is moved out of the optical path before said aperture drive begins to close said aperture.

12. A photometry device, comprising:

an imaging optical system for directing incident light;

means for moving a predetermined optical element in said imaging optical system;

a metering sensor for measuring an amount of light;

means for redirecting said incident light to said metering sensor, and means for redirecting being movable between operative and retracted positions;

means for converting a driving force of said means for moving to a driving force for moving said means for redirecting between said operative and retracted positions;

a motor;

said means for moving including a driving disk rotatable by said motor; and said means for converting converts a driving force of said driving disk to a driving force for moving said means for redirecting between said operative and retracted positions.

13. The photometry device according to claim 12, wherein said means for converting further comprises:

a cam groove formed in said driving disk, a variable distance separating said cam groove from a rotational center of said driving disk; and a cam follower pin linked to said means for redirecting, said cam follower pin following said cam groove and transmitting said driving force of said driving disk to said means for redirecting.

14. The photometry device according to claim 13, wherein said variable distance is limited to a predetermined range for limiting a range of movement of said means for redirecting.

15. The photometry device according to claim 13, wherein said means for converting further comprises:

a rotatable shaft to which said means for redirecting is secured, said rotatable shaft defining a swinging axis; and a crank attached to said rotatable shaft and swingable with said rotatable shaft about said swinging axis, said cam follower pin extending from said crank at a position displaced from said rotatable shaft, whereby movement of said cam groove by said cam follower pin drives said means for redirecting about said swinging axis between said operative and retracted positions.

16. The photometry device according to claim 15, wherein said swinging axis is parallel to, and displaced from, an optical path of said imaging optical system.

17. The photometry device according to claim 16, wherein said operative position is a position in said optical path, and said retracted position is a position out of said optical path.

18. The photometry device according to claim 17, wherein said means for redirecting comprises:
a reflective surface provided at a distance from said swinging axis, said distance corresponding to the displacement of said swinging axis from said optical path.

19. The photometry device according to claim 12, wherein said means for redirecting is swingably supported to, swing about a swinging axis parallel to and displaced from, an optical path of said imaging optical system, and
wherein said means for converting converts said driving force of said driving disk to drive said means for redirecting about said swinging axis into and out of said optical path.

20. An imaging device, comprising:
first and second optically responsive elements;
an imaging optical system for directing incident light upon said first optically responsive element;
an aperture mechanism having a variable aperture, for controlling an amount of light passing through said imaging optical system;
an aperture drive for driving said aperture mechanism to open and close said aperture mechanism;
a light redirecting member, for redirecting said incident light from said imaging optical system to said second optically responsive element;
means for moving said light redirecting member into and out of an optical path between said imaging optical system and said first optically responsive element, said means for moving being driven by motion of said aperture drive to move said light redirecting member out of the optical path before said aperture drive closes said aperture mechanism.

21. The photometry device according to claim 20, further comprising:
a motor;
said aperture drive including a driving disk rotatable by said motor to control a size of said variable aperture, and
rotational motion of said driving disk drives said means for moving said light redirecting member into and out of the optical path between said imaging optical system and said first optically responsive element.

22. The photometry device according to claim 21, wherein said driving disk further comprises:
a cam groove formed in said driving disk, a variable distance separating said cam groove and a rotational center of said driving disk, and
wherein said means for moving said light redirecting member further comprises:
a cam follower pin linked to said light redirecting member, said cam follower pin following said cam groove and moving said light directing member.

23. The photometry device according to claim 22, wherein said variable distance is limited by a predetermined range for limiting a range of movement of said light redirecting member.

24. The photometry device according to claim 22, wherein said means for moving further comprises:
a rotatable shaft to which said light redirecting member is secured, said rotatable shaft defining a swinging axis; and
a crank attached to said rotatable shaft and swingable with said rotatable shaft about said swinging axis, said cam follower pin extending from said crank at a position displaced from said rotatable shaft,
whereby movement of said cam groove by said cam follower pin is converted to swinging motion of said light redirecting member into and out of said optical path.

25. The photometry device according to claim 24, wherein said swinging axis is parallel to, and displaced from, said optical path.

26. The photometry device according to claim 25, wherein said means for moving moves said light redirecting member about said swinging axis into and out of said optical path.

27. The photometry device according to claim 20, wherein said means for moving moves said light redirecting member into and out of said optical path within a plane perpendicular to said optical path.

28. The photometry device according to claim 27, wherein said light redirecting member is swingably supported to swing about a swinging axis parallel to, and displaced from, said optical path, and
wherein said means for moving moves said light redirecting member about said swinging axis into and out of said optical path.

29. The photometry device according to claim 28, wherein said light redirecting member further comprises:
a reflective surface provided on said light redirecting member at a distance from said swinging axis corresponding to a distance separating said swinging axis from said optical path.

30. The imaging device of claim 20, wherein said light redirecting member is moved out of the optical path before said aperture drive begins to close said aperture.

31. An imaging device, comprising:
an imaging sensor;
an optical system for forming an image onto said imaging sensor from light passing along an optical path through said optical system along an optical path, said optical system including an aperture mechanism having an aperture drive for controlling an amount of light passing through said optical system;
a swingable member swingable about a swinging axis parallel to, and displaced from, said optical path, a distal end of said swingable member being swingable into and out of said optical path;
a surface provided on said distal end of said swingable member for blocking a portion of said light when said distal end of said swingable member swings into said optical path;
means for measuring an amount of light incident on said surface; and
means for transmitting motion from said aperture drive to swing said distal end of said swingable member into and out of said optical path.

32. The photometry device according to claim 31, further comprising:
a motor; and said aperture drive including a driving disk rotatable by said motor to control said amount of light passing through said optical system.

33. The photometry device according to claim 32, wherein said means for transmitting motion comprises:

a cam groove formed in said driving disk, a variable distance separating said cam groove from a rotational center of said driving disk; and a cam follower pin, linked to said swingable member, said cam follower pin following said cam groove and moving said light directing member.

34. The photometry device according to claim 33, wherein said variable distance is limited to a predetermined range for limiting a range of movement of said swingable member.

35. The photometry device according to claim 33, wherein said means for transmitting motion further comprises:

a rotatable shaft to which said swingable member is secured, said rotatable shaft defining said swinging axis; and a crank attached to said rotatable shaft and swingable with said rotatable shaft about said swinging axis, said cam follower pin extending from said crank at a position displaced from said rotatable shaft, whereby movement of said cam groove by said cam follower pin is transmitted to said swingable member.

36. The photometry device according to claim 31, wherein said surface comprises:

a reflective surface for reflecting light to said means for measuring, said reflective surface provided on a distal end of said swingable member at a distance from said swinging axis corresponding to a distance separating said swinging axis from said optical path.

* * * * *

UNITED STATES PATENT AND TRADEMARK OFFICE
CERTIFICATE OF CORRECTION

PATENT NO. : 5,765,060
DATED : June 9, 1998
INVENTOR(S) : Hitoshi SHIMIZU

It is certified that error appears in the above-identified patent and that said Letters Patent is hereby corrected as shown below:

At column 9, line 21 (claim 2, line 8) of the printed patent, change "sand" to ---said---.

Signed and Sealed this

Thirteenth Day of April, 1999

Attest:

Q. TODD DICKINSON

*Attesting Officer*             *Acting Commissioner of Patents and Trademarks*